Patented Nov. 1, 1932

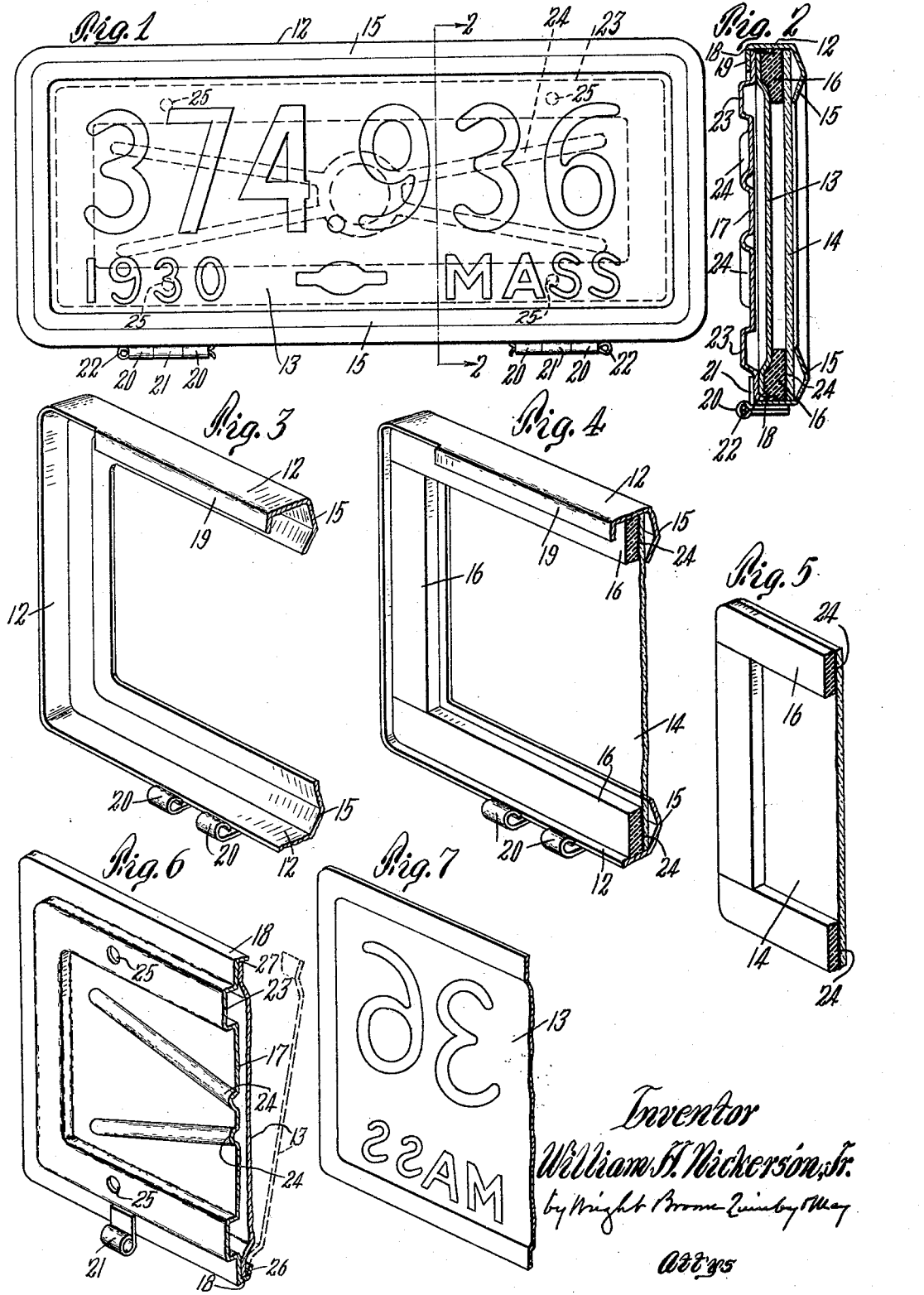

1,886,352

UNITED STATES PATENT OFFICE

WILLIAM H. NICKERSON, JR., OF NEWTON, MASSACHUSETTS

LICENSE PLATE HOLDER FOR MOTOR VEHICLES

Application filed December 8, 1931. Serial No. 579,667.

The invention relates to a holder for the usual official license plate of a motor vehicle, adapted to confine the plate, exclude dust and rain from the visible outer side thereof when the vehicle is in use, and exclude water from said visible side when the vehicle is being washed.

The invention is embodied in the improved construction hereinafter described and claimed.

Of the accompanying drawing forming a part of this specification Figure 1 is a front view showing a holder embodying the invention, and a license plate held thereby.

Figure 2 is a section held on line 2—2 of Figure 1.

Figure 3 is a fragmentary perspective view showing a portion of the frame element of the holder.

Figure 4 is a view similar to Figure 3 showing portions of the transparent pane and the compressible packing strips hereinafter described.

Figure 5 is a fragmentary perspective view showing portions of the packing strips and a portion of the pane.

Figure 6 is a fragmentary perspective view showing a portion of the license plate and a portion of the license plate holding pan hereinafter described.

Figure 7 is a fragmentary perspective view showing a portion of the license plate.

The same reference characters indicate the same parts in all of the figures.

My improved holder comprises an oblong frame formed to surround the margins of a license plate 13 and a pane 14 of glass or other transparent material protecting the outer side of said plate.

The frame includes a rim 12 and a continuous flange 15 projecting inward from the rim and constituting a seat for the marginal portion of the pane 14, the rim and flange being preferably constructed in one piece from sheet metal.

A frame shaped packing of compressible water proof material, such as soft vulcanized rubber, bears on the inner surface of the pane 14 and on the inner side of the rim 12. The outer side of said packing constitutes a compressible seat for the marginal portion of the inner side of the pane, and the inner side of the packing constitutes a compressible seat for the marginal portion of the outer side of the license plate 13. The packing is composed of flat sided compressible rubber strips 16, the outer edges of said strips bearing on the inner surfaces of the rim 12, and the outer sides of the strips on the pane, as indicated by Figure 4. The strips are separately assembled and have meeting edge portions which form tight butt joints when the strips are compressed.

The holder includes a shallow pan formed to be surrounded by the rim 12 and bear on the inner side of the license plate, said pan including a bottom 17 constituting a back plate and a rim 18 which surrounds the margin of the license plate, and projects into the frame.

Any suitable coupling means may be employed to detachably secure the pan to the frame, and press the license plate against the gasket, and the gasket against the pane 14, and thereby compress the gasket and cause it to cooperate with the pane in excluding dust and water from the visible side of the plate when the vehicle is in use and is being washed. The coupling means, in this instance, includes a downwardly projecting lip 19 on the rear edge of the top member of the rim 12, a pair of hinges each including two spaced apart hinge socket members 20 fixed to the bottom member of the rim, a single hinge socket member 21 fixed to the lower edge of the pan bottom 17 and located between the members 20, and a pintle member 22 removably insertable in the socket members, the pintle member being preferably a cotter pin as shown by Figure 1.

The frame, the pane 14, and the gasket are assembled as shown by Figure 4. The pan is attached, as hereinafter described, to a motor vehicle, and the license plate is inserted in the pan. The frame is then engaged with the pan by first shoving the frame lip 19 upon one longitudinal edge portion of the pan, then swinging the frame until it surrounds the margin of the pan, and the socket members 21 are alined with the socket members 20, and finally inserting the pintle members 22. This operation causes the compression of the assembled strips 16 as shown by Figure 2, the pan rim 18 indenting and compressing the outer marginal portions of the strips 16 as shown by Figure 2, and thus increasing the effectiveness of the strips as packing members.

The pan bottom 17 is embossed to stiffen and oppose distortion thereof. In this instance said bottom is provided with an angular outer boss 23 parallel with the margin of the bottom, and an inner boss 24 surrounded by the angular boss.

The lip 19 on one of the members of the rim 12 arranged to engage an edge portion of the pan bottom 17, the socket members 20 on the opposite member of said rim, the socket member 21 on the opposite edge portion of the pan bottom, and the cotter pins 22 separably engageable with said socket members, constitute the preferred embodiment of means whereby the frame is releasably confined on the pan and the license plate 13 is caused to compress the packing strips 16 between the marginal portions of the license plate and the pane, and at the same time press the meeting edges of said strips against each other and form tight joints, so that said strips constitute a sectional gasket adapted to cooperate with the pane in excluding dust and water from the visible side of the license plate, the said socket members and pin constituting interengageable and separable coupling parts.

Said means may be otherwise embodied, if desired, to perform the described function.

The flat sided rubber strips 16 are adapted to be quickly and conveniently assembled in the frame as indicated by Figure 4, and constitute an effective and inexpensive sealing gasket which is entirely concealed by the frame when the holder is in use. The strips are preferably cemented to the inner side of the pane, cement joints being indicated at 24 in Figure 5. The pane and gasket strips are therefore adapted to be inserted in the frame as a unit.

The pan is made from a single piece of sheet metal. The bosses 23 and 24 constitute a suitable embodiment of means stiffening the sheet metal bottom or back plate of the pan, and preventing flexure and distortion thereof. The pan bottom is therefore maintained in a flat condition and adapted to uniformly compress all portions of the gasket.

Owing to the fact that the gasket is entirely concealed by the frame, deterioration of any part of the gasket by exposure to the weather is prevented, and the appearance of the holder is improved. This is true whether the gasket is composed of separate strips as I prefer, or made in one piece.

The holder is attached to a motor vehicle by fasteners such as bolts or screws (not shown) inserted in holes 25 in the boss 23 of the pan bottom, and engaged with suitable supporting means on the vehicle, said fasteners being applied before the license plate is inserted in the pan. After the pan is thus attached the license plate is inserted in the pan, and then the assembly formed by the frame, the pane 14 and the gasket, as shown by Figure 4, is engaged as described with the pan.

To prevent the license plate from falling out of the pan before the plate and pan are assembled with the frame, and while the parts are being assembled, I bend or offset a portion of one of the longitudinal members of the rim 18 of the pan bottom and thereby form a stop 26 (Figure 6), preventing movement of one of the longitudinal edges of the license plate 13 outward from the pan. The opposite longitudinal member of the rim 18 is not provided with a stop. The plate 13 is first partly inserted in the pan in the inclined position shown by dotted lines in Figure 6, one of its longitudinal edges being inserted behind the stop 26. The plate is then swung to a position parallel with the pan bottom 17 as shown by full lines in Figure 6. Accidental outward movement of the plate from the pan is now prevented partly by the engagement of one of the plate edges with the stop 26 and partly by the frictional bearing of the opposite plate edge with the longitudinal member of the rim 18 opposite the member having said stop. There may be two or more stops 26.

It will be seen that the lip 19, the hinge members 20 and 21, and the removable pintles 22, constitute a suitable embodiment of separable connections between the frame and pan, said connections including means for maintaining the license plate 13 spaced from the pane 14 a distance less than the thickness of the gasket strips 16, so that said strips are compressed and their butt joints closed to effectively exclude dust and water from the visible side of the license plate.

I claim:

1. A license plate holder comprising a marginal frame including a rim and a flange projecting inwardly therefrom at the outer side of the holder, a transparent pane whose outer side is seated on the inner side of said flange, compressible gasket strips cemented to the marginal portions of the inner side of the pane and meeting at portions of their edges to form butt joints, said strips being arranged to form a frame shaped gasket, a shallow license plate-receiving pan formed to enter the frame rim and including a bottom constituting the back of the holder, and a marginal rim projecting into the frame, separable connections between the frame and the pan, said connections including means for maintaining a license plate spaced from the pane a distance less than the thickness of the gasket strips, so that said strips are compressed and their butt joints closed, to exclude dust and water from the visible side of the license plate.

2. A license plate holder comprising a marginal frame including a rim and an inwardly projecting flange, a transparent pane seated on said flange, a frame-shaped compressible gasket on the marginal portion of the pane, a license plate-holding pan formed to enter the frame, and including a bottom and a marginal rim projecting therefrom, said frame and pan being provided with means separably connecting the frame with the pan and exerting pressure to press the license plate against the gasket, and the gasket against the pane, the rim of the plate-receiving pan projecting into the frame sufficiently to indent and compress the entire marginal portion of the gasket.

3. A license plate holder comprising a marginal frame including a rim and an inwardly projecting flange, a frame shaped compressible gasket on the marginal portion of the pane, a license plate-holding pan formed to enter the frame, and including a bottom and a marginal rim projecting therefrom, said frame and pan being provided with means separably connecting the frame with the pan and exerting pressure to press the license plate against the gasket, and the gasket against the pane, one of the longitudinal members of the pan rim being provided with stop means adapted to engage one longitudinal edge of the license plate, the width of said plate being such that its opposite longitudinal edge is frictionally engageable with another longitudinal member of the pan rim.

In testimony whereof I have affixed my signature.

WILLIAM H. NICKERSON, Jr.